Nov. 30, 1965       W. YOGUS       3,220,288
COLLET TYPE PRESS FIT BORING UNIT ASSEMBLY
Filed May 7, 1964
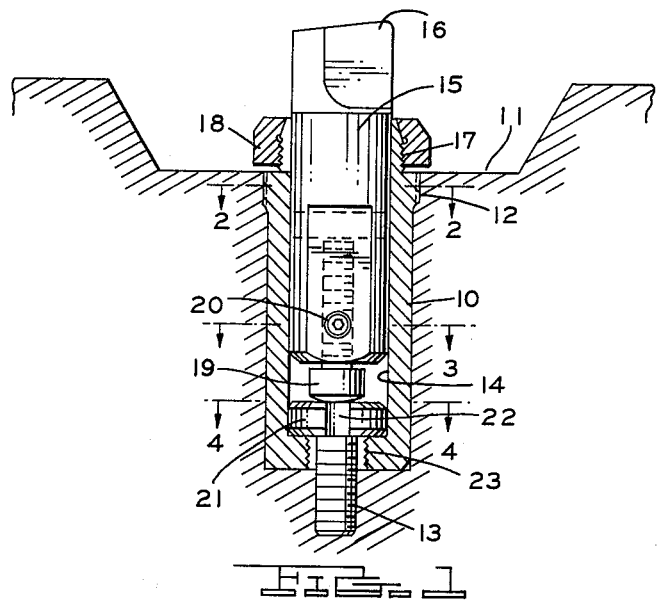
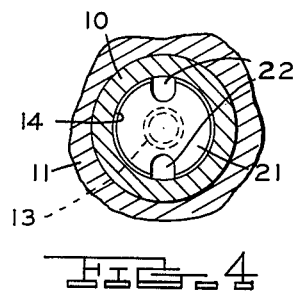
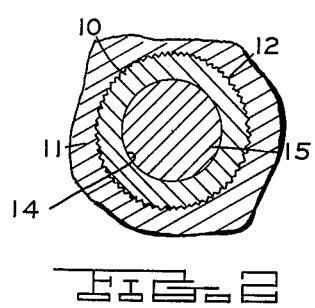
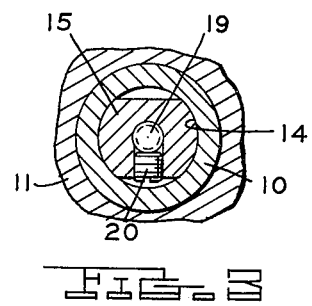
INVENTOR
WILLIAM YOGUS
BY Farley, Forster
and Farley
ATTORNEYS

3,220,288
COLLET TYPE PRESS FIT BORING UNIT ASSEMBLY
William Yogus, Birmingham, Mich., assignor to The Valeron Corporation, Detroit, Mich., a corporation of Michigan
Filed May 7, 1964, Ser. No. 365,770
4 Claims. (Cl. 77—58)

This invention relates to a boring unit assembly and more particularly to a collet type cartridge press fit into a boring bar having a replaceable pre-settable boring tool.

The objects and advantages of the invention may best be understood from the following description of a preferred embodiment with reference to the drawings wherein:

FIG. 1 is a sectional side elevation of the boring unit assembly; and

FIGS. 2, 3 and 4 are sectional views taken along the lines 2—2, 3—3 and 4—4 respectively of FIG. 1.

With reference to the drawings, the cartridge assembly includes a cylindrical casing 10 dimensioned for press fit in a cylindrical aperture of a boring bar 11 which may be a blind hole as shown. The upper end of the casing 12 is preferably knurled, as best shown in FIG. 2, to lock the casing against rotation when pressed into the boring bar, and a machine screw 13 adapted to engage a tapped hole in the boring bar is preferably employed for drawing the casing "home" to a firmly seated and locked position in the boring bar. The casing 10 is provided with a cylindrical tool socket 14 finished to receive the cylindrical shank 15 of a replaceable cutter insert having a cutting element 16 and the upper end 17 of the casing 10 is formed as a split collet, threaded and tapered to receive a locking collar nut 18. The lower end of the tool shank is drilled and tapped to receive an adjustment screw 19, held in adjusted position by set screw 20, and having a head adapted to bottom on the head 21 of the screw 13 which is provided with spanner wrench recesses 22, as shown in FIG. 4 to leave a true registration surface at the center.

From the foregoing description it will be understood that the effective length of the replaceable tool shank 15 may be pre-set outside of the cartridge after resharpening, or as a replacement insert, and returned to an accurate cutter position in the boring unit assembly whereupon the locking collar nut 18 may be tightened to securely anchor the shank and cutting element.

A tapped hole 23 at the inner end of the casing having a clearance relation with the machine screw 13 is provided to accommodate, when the tool shank 15 and screw 13 have been removed, the engagement of a retraction screw by which the casing may be drawn out of the boring bar if desired.

While a particular embodiment has been shown and described above in detail it will be understood that numerous modifications might be resorted to without departing from the scope of the invention as defined in the following claims.

I claim:
1. A boring unit assembly comprising a boring bar having a cylindrical aperture therein, a cylindrical casing adapted to be press fit into said aperture, a cylindrical aperture in said casing, a cylindrical tool shank fitting within said casing aperture, said casing having a collet end for engaging said tool shank, a reduced aperture at the inner end of said casing, a threaded hole at the bottom of said cylindrical aperture in said boring bar and a headed machine screw adapted to extend through said reduced aperture and into said threaded hole in said boring bar for drawing said casing into a seated press fit position.

2. A boring unit assembly as set forth in claim 1 wherein said reduced aperture has a clearance relationship with said screw and is threaded to receive a larger diameter retraction screw.

3. A boring unit assembly as set forth in claim 1 wherein said shank is provided with an adjustment screw adapted to register against the head of said first mentioned screw, limiting the axial position of said shank in said casing.

4. A boring unit assembly as set forth in claim 1 wherein said shank is provided with an adjustment screw adapted to register against the head of said first mentioned screw, limiting the axial position of said shank in said casing, said casing being provided with a knurled surface for engaging said boring bar and preventing rotation of said casing relative thereto.

References Cited by the Examiner
UNITED STATES PATENTS
1,090,205   3/1914   Gorton _____ 29—105
2,412,937  12/1946   Allen.

FOREIGN PATENTS
106,625   5/1917   Great Britain.

WILLIAM W. DYER, Jr., *Primary Examiner.*
G. A. DOST, *Assistant Examiner.*